D. C. TAYLOR.

Improvement in Apparatus for Moulding Leather, &c.

No. 132,117.  Patented Oct. 8, 1872.

Witnesses.
Harry Smith
John K. Rupertus

De Witt C. Taylor
by his Attys.
Howson and Son

UNITED STATES PATENT OFFICE.

DE WITT C. TAYLOR, OF NEW YORK, N. Y.

IMPROVEMENT IN APPARATUS FOR MOLDING LEATHER, &c.

Specification forming part of Letters Patent No. 132,117, dated October 8, 1872.

*To all whom it may concern:*

Be it known that I, DE WITT C. TAYLOR, of the city, county, and State of New York, have invented a Mode of and Apparatus for Molding Leather and other material, of which the following is a specification:

My invention has for its object the molding of leather and other analogous material without the aid of the costly metallic formers heretofore used for the purpose; and this end I accomplish by simply forcing the leather or other material into a slab of rubber, with a metallic die of the desired shape.

Figure 1:
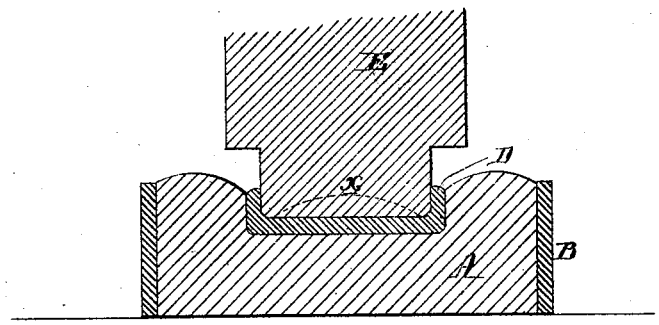
Figure 2:
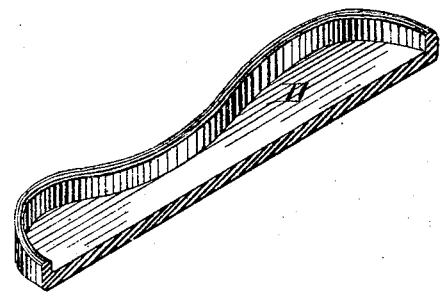

In the present instance I have illustrated my invention as applied to the molding and flanging of shoe-soles preparatory to the stitching of the same to the upper. A strip, D, of leather, cut to the desired shape of the sole, is placed on a comparatively thick slab, A, of rubber, which is confined within a metal band or box, B, to prevent lateral expansion, and the whole is placed on the bed of any suitable press. A metallic die, E, of the desired shape, is then applied, under pressure, to the leather, and the rubber yields to this pressure, at the same time turning up the edges of the leather, and exerting such lateral pressure on these turned up edges as to convert them into properly-defined flanges, as shown in the perspective view, Fig. 2, which represents one-half of the sole. While this turning up of the edges is accomplished during the descent of the die the body of the sole is subjected to pressure; in fact, the sole is molded to the desired shape throughout, and retains this shape after the pressure has been removed.

If desired, the die may be made concave, as shown by the dotted line $x$, or of any other desired form, so as to impart a corresponding shape to the leather. It should be understood that the leather must be rendered soft and pliable prior to being treated in the manner described. Other materials, paper or pasteboard, for instance, may be molded by the same process.

I claim—

1. The molding and flanging of leather and other material by causing a die to depress it into rubber, as set forth.

2. The combination of the slab A, of rubber, the band or box for confining the same laterally, and a die, E.

In testimony whereof I have signed my name to this specification in the presence of two subscribing witnesses.

DE WITT C. TAYLOR.

Witnesses:
 WM. A. STEEL,
 HARRY W. DOUTY.